US012626532B2

(12) United States Patent
Mohanty et al.

(10) Patent No.: US 12,626,532 B2
(45) Date of Patent: May 12, 2026

(54) METHOD FOR SYNTHETIC VIDEO/IMAGE DETECTION

(71) Applicant: UNIVERSITY OF NORTH TEXAS, Dallas, TX (US)

(72) Inventors: Saraju P. Mohanty, Dallas, TX (US); Elias Kougianos, Dallas, TX (US); Alakananda Mitra, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 211 days.

(21) Appl. No.: 18/485,285

(22) Filed: Oct. 11, 2023

(65) Prior Publication Data

US 2024/0153306 A1 May 9, 2024

Related U.S. Application Data

(60) Provisional application No. 63/382,034, filed on Nov. 2, 2022, provisional application No. 63/379,248, filed on Oct. 12, 2022.

(51) Int. Cl.
| | |
|---|---|
| *G06V 40/16* | (2022.01) |
| *G06V 10/54* | (2022.01) |
| *G06V 10/82* | (2022.01) |
| *G06V 20/40* | (2022.01) |
| *G06V 40/40* | (2022.01) |

(52) U.S. Cl.
CPC ............. *G06V 40/171* (2022.01); *G06V 10/54* (2022.01); *G06V 10/82* (2022.01); *G06V 20/46* (2022.01); *G06V 40/161* (2022.01); *G06V 40/45* (2022.01)

(58) Field of Classification Search
CPC ...................................................... G06V 20/46
See application file for complete search history.

(56) References Cited

U.S. PATENT DOCUMENTS

2022/0058375 A1* 2/2022 Kwon ................... G06T 7/0002

OTHER PUBLICATIONS

Xu et al, "DeepFake Videos Detection Based on Texture Features", Tech science press, pp. 1375-1388, 2021 (Year: 2021).*
Mitra et al, "A Machine Learning based Approach for DeepFake Detection in Social Media through Key Video Frame Extraction", SNCS, pp. 1-17, 2021 (Year: 2021).*
Yavuzkilic et al, "Spotting Deepfakes and Face Manipulations by Fusing Features from Multi-Stream CNNs Models", Symmetry, pp. 1-15, 2021 (Year: 2021).*

* cited by examiner

*Primary Examiner* — Edward Park
(74) *Attorney, Agent, or Firm* — Andrew M. Metrailer; Conley Rose, P.C.

(57) ABSTRACT

A method of identifying synthetic media can include identifying a facial image in video or images, extracting a first set of features from the facial image, extracting a second set of features from the facial image, wherein the first set of features are different than the second set of features, inputting the first set of features into a first prediction model, generating a first output indicative of a nature of the facial image, inputting the second set of features into a second prediction model, generating a second output indicative of the nature of the facial image, and determining the nature of the facial image using the first output and the second output.

16 Claims, 9 Drawing Sheets

Person

Proposed FakeShield System

Proposed FakeShield System

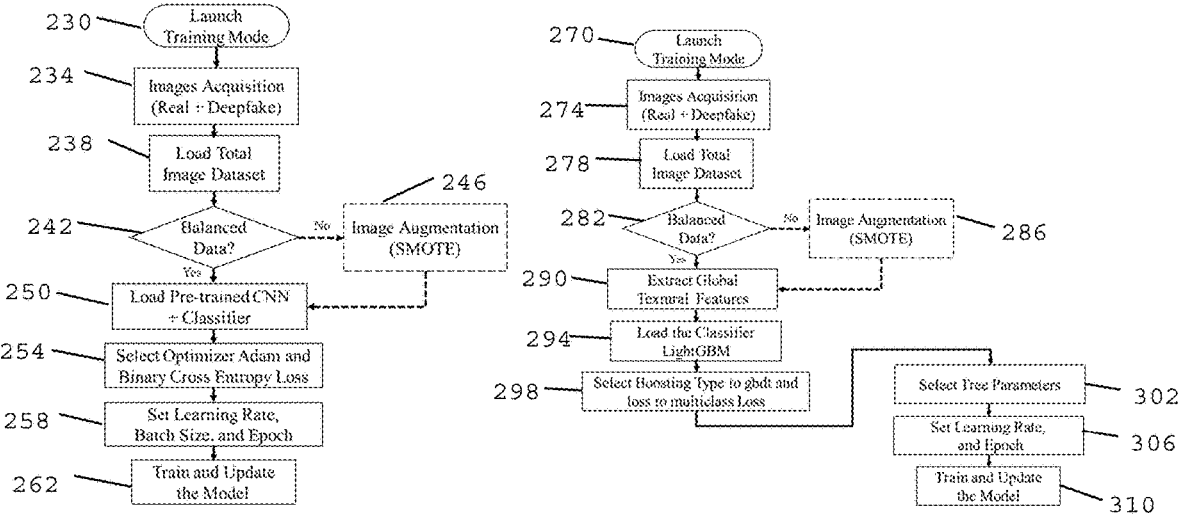

230 — Launch Training Mode
234 — Images Acquisition (Real + Deepfake)
238 — Load Total Image Dataset
242 — Balanced Data?
246 — Image Augmentation (SMOTE)
250 — Load Pre-trained CNN + Classifier
254 — Select Optimizer Adam and Binary Cross Entropy Loss
258 — Set Learning Rate, Batch Size, and Epoch
262 — Train and Update the Model

*FIG. 5*

270 — Launch Training Mode
274 — Images Acquisition (Real + Deepfake)
278 — Load Total Image Dataset
282 — Balanced Data?
286 — Image Augmentation (SMOTE)
290 — Extract Global Textural Features
294 — Load the Classifier LightGBM
298 — Select Boosting Type to gbdt and loss to multiclass Loss
302 — Select Tree Parameters
306 — Set Learning Rate, and Epoch
310 — Train and Update the Model

*FIG. 6*

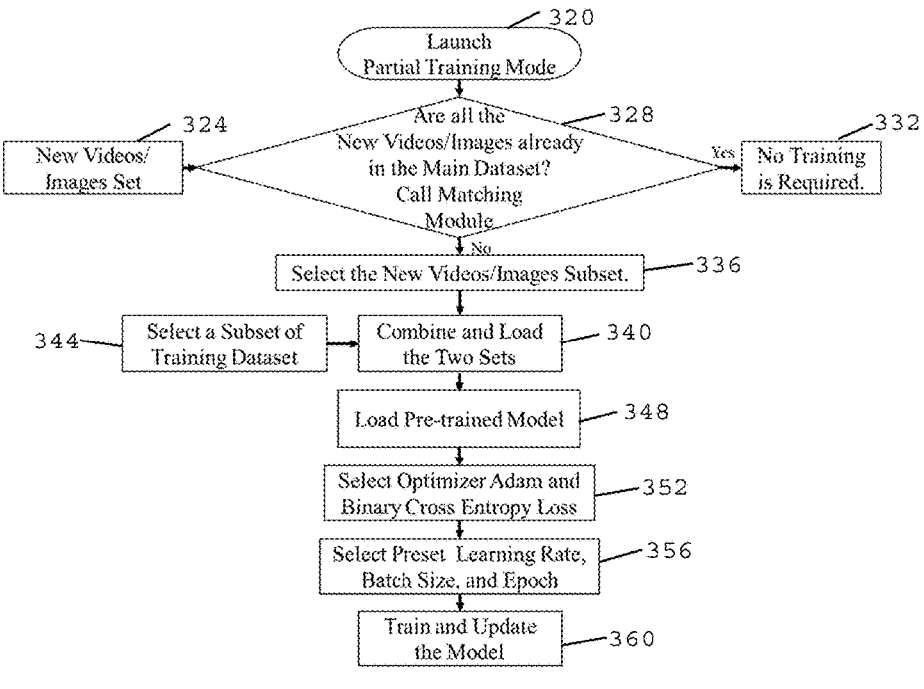

320 — Launch Partial Training Mode
328 — Are all the New Videos/Images already in the Main Dataset? Call Matching Module
324 — New Videos/Images Set
332 — No Training is Required.
336 — Select the New Videos/Images Subset.
344 — Select a Subset of Training Dataset
340 — Combine and Load the Two Sets
348 — Load Pre-trained Model
352 — Select Optimizer Adam and Binary Cross Entropy Loss
356 — Select Preset Learning Rate, Batch Size, and Epoch
360 — Train and Update the Model

*FIG. 7*

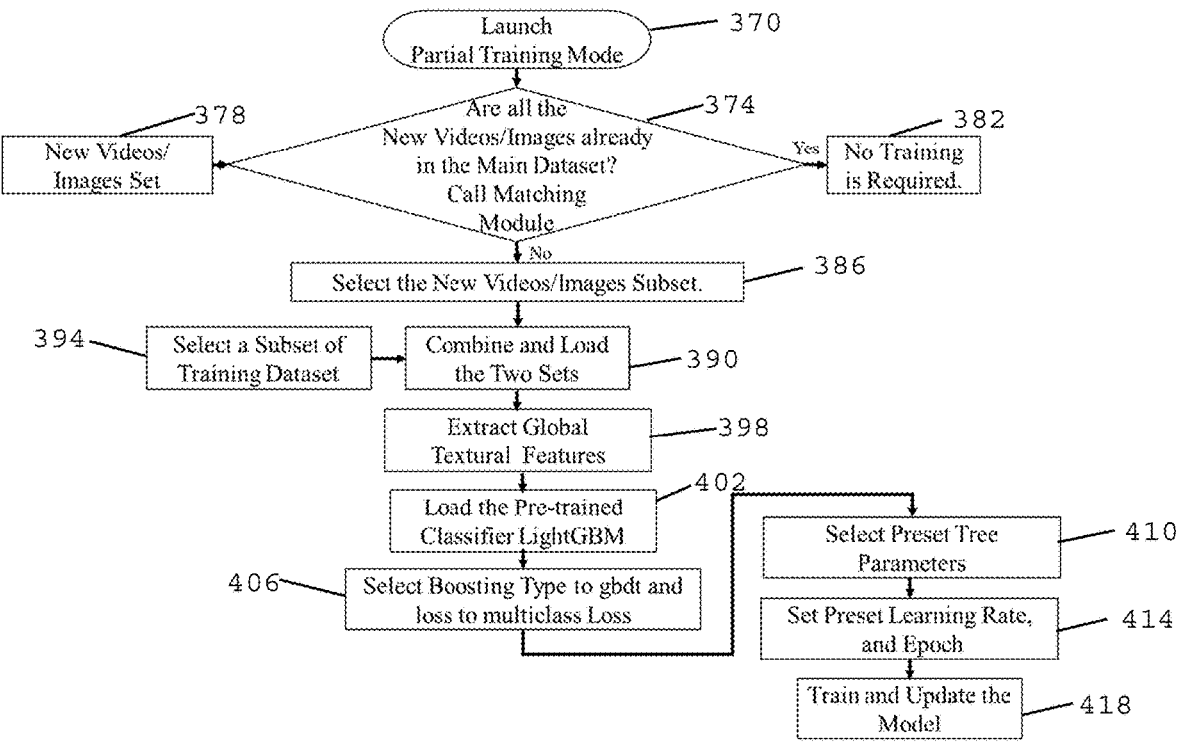

Launch
Partial Training Mode — 370

Are all the
New Videos/Images already
in the Main Dataset?
Call Matching
Module — 374

New Videos/
Images Set — 378

No Training
is Required. — 382

Yes

No

Select the New Videos/Images Subset. — 386

Select a Subset of
Training Dataset — 394

Combine and Load
the Two Sets — 390

Extract Global
Textural Features — 398

Load the Pre-trained
Classifier LightGBM — 402

Select Boosting Type to gbdt and
loss to multiclass Loss — 406

Select Preset Tree
Parameters — 410

Set Preset Learning Rate,
and Epoch — 414

Train and Update the
Model — 418

*FIG. 8*

METHOD FOR SYNTHETIC VIDEO/IMAGE DETECTION

CROSS-REFERENCE TO RELATED APPLICATIONS

This application claims the benefit of U.S. Provisional Application No. 63/379,248, filed on Oct. 12, 2022, and entitled "METHOD FOR SYNTHETIC VIDEO/IMAGE DETECTION," and U.S. Provisional Application No. 63/382,034, filed on Nov. 2, 2022, and entitled "METHOD FOR SYNTHETIC VIDEO/IMAGE DETECTION", which are both incorporated herein by reference in their entirety for all purposes.

STATEMENT REGARDING FEDERALLY FUNDED RESEARCH OR DEVELOPMENT

None.

BACKGROUND

Deep fake videos can be problematic and difficult to detect. Generally, there is a need for a mechanism to detect such deep fake videos. Deepfakes are a new type of threat that fall under the larger and more widespread umbrella of synthetic media. Deepfakes use a form of artificial intelligence and machine learning (AI/ML) to create videos, pictures, audio, and text of events that never happened. These deepfakes look, sound, and feel real. While some uses of synthetic media are just for amusement, others come with a degree of risk. Due to people's inherent tendency to trust what they see, deepfakes and synthetic media can be useful in disseminating misinformation.

BRIEF DESCRIPTION OF THE DRAWINGS

The drawings aid the explanation and understanding the invention. Since it is not usually possible to illustrate every possible embodiment, the drawings depict only example embodiments. The drawings are not intended to limit the scope of the invention. Other embodiments may fall within the scope of the disclosure and claims.

FIG. 5 illustrates the initial training procedure for the CNN model according to some embodiments.

FIG. 6 illustrates the initial training procedure for the ML model according to some embodiments.

FIG. 7 illustrates the partial training procedure for the CNN model according to some embodiments.

FIG. 8 illustrates the partial training procedure for the ML model according to some embodiments.

DETAILED DESCRIPTION

Figure 1:
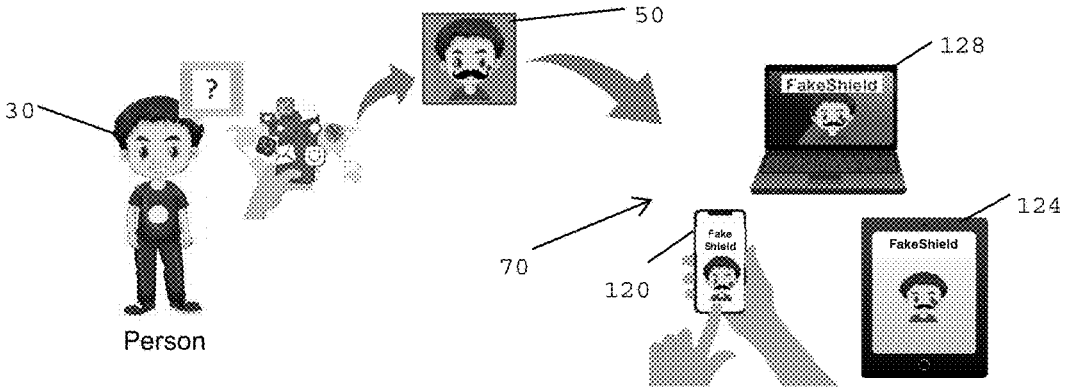
FIG. 1 illustrates a schematic representation of synthetic media detection system according to some embodiments.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

As used herein, the term "and/or" can mean one, some, or all elements depicted in a list. As an example, "A and/or B" can mean A, B, or a combination of A and B. What is more, the use of a "slash" between two elements, such as A/B, can mean A or B.

The term deepfake was coined from the words "deep learning" and "fake." Deepfake images/videos use AI/deep learning technology to alter a person's face, emotion, or speech to that of someone else's face, emotion, or speech. These deepfake images/videos/audios/texts are designed to be indistinguishable from real ones. Cloud computing, public research AI algorithms, and copious data have made the ultimate storm to enable the democratization of deepfakes for distribution via social media platforms at a large scale.

Deepfakes and the inappropriate use of synthetic content offer a threat to the public that is undeniable, ongoing, and ever evolving in the areas of national security, law enforcement, the financial sector, and society. As an example, "deepfake" technology can distort reality unbelievably, and the technology disrupts the truth. Deepfakes threaten individuals, businesses, society, and democracy and erode media confidence. Erosion of trust can foster factual relativism, unraveling democracy, and civil society. Deepfakes can help the least democratic and authoritarian governments prosper by using the "liar's dividend," where unpalatable truths are swiftly rejected as "fake news." People no longer trust media news or images/videos. Political tension or violence can happen. Non-consensual pornography proliferated deepfake content and currently represents most AI-enabled synthetic content in the wild.

Deepfakes can hurt individuals and society, both intentionally and unintentionally. Deepfakes can deepen the worldwide post-truth dilemma since they are so lifelike that they mislead a viewer's sight and hearing. Putting words in someone else's mouth, switching faces, and generating synthetic images and digital puppets of public personas are morally dubious behaviors that could hurt individuals and institutions. Deepfakes are also used to misrepresent a company's product, executives, and brand. This technique is aimed at harming a company's market position, manipulate the market, unfairly diminish competition, hurt a competitor's stock price, or target mergers and acquisitions. Deepfakes can slander and infringe privacy. They can depict a person in such a scenario that would affect their reputation or social standing.

As additional examples, insurgent groups and terrorist organizations can employ deepfakes to portray their opponents as making offensive remarks or engaging in provocative behaviors to stir up anti-state emotions. States can deploy computational propaganda against a minority community or another country. Deepfake audio/video can influence an election by spreading lies. Impersonation is another area where deepfake plays a significant role. In today's connected world, when people access various facilities through Internet, they can be victims of deepfakes. Misusing someone's voice and images without her consent is unethical and illegal. Although synthetic data generation through deep learning is gaining popularity in the AI community as it solves the problem of data scarcity, it is ethically improper. Those synthetic images are also deepfakes and the images of real people are being used without their proper consent.

Additionally, if deepfake are created with ill intention, bias, racism, color, segregation, and biased ideologies, the deepfake can affect society. If they are used to train an AI/ML/deep learning model for any decision making, incorrect and biased predictions may be generated.

Disclosed herein is a deepfake video/image detection system. People remember people by how they look. A person's face is authenticated in various Facial Recognition Systems (FRS) in different sectors of life. So, when fake images and videos are used, face manipulation is the one that is most often used. Impersonating a person can be illegal and a crime. To address the threat, a deepfake detection system is disclosed, which would detect various state-of-the-art deepfakes. It is an ensemble model using various modules with each serving a different purpose.

The systems and methods disclosed herein relate to a novel method for detecting deepfake images and videos abundant in social media. The systems and methods detect highly sophisticated deepfake images and videos that are created by the state-of-the-art deep neural networks. Some of the problems that have been solved using the present systems and methods include a) the problem of automatically detecting deepfake images/videos, b) the problem of not having an end-to-end unified system for detecting deepfakes, c) the problem of detecting social media videos for possible deepfake attacks, d) the problem of not having an Internet-of-Things (IoT)-edge computing method for detecting deepfake images/videos at mobile devices, e) the problem of not considering several types of deepfakes created by autoencoders and various generative adversarial networks (GAN), and f) the problem of not including auxiliary approaches.

The present systems and methods include a number of new features. These can include: a) a novel method for detecting deepfake images/videos, b) it is an automatic process, c) it is a low computing method, d) it is an edge friendly method, e) less user intervention is needed, f) it has high success rate, g) it checks global textural features of a frame so that discrepancies in frames get detected, h) it also works for social media compressed videos, i) it can detect deepfake images/videos generated by autoencoder and different state-of-the-art generative adversarial networks (GAN), and j) it gives real time predictions.

Referring to FIG. 1, a schematic representation of a synthetic media detection system 70 is provided. As depicted, a person 30 can receive an image 50. Using the synthetic media detection system 70, the person 30, who may question the image 50, can evaluate the image 50 using the system 70 operating on any suitable user device, such as a phone 120, a tablet 124, or a laptop 128.

Figure 2:
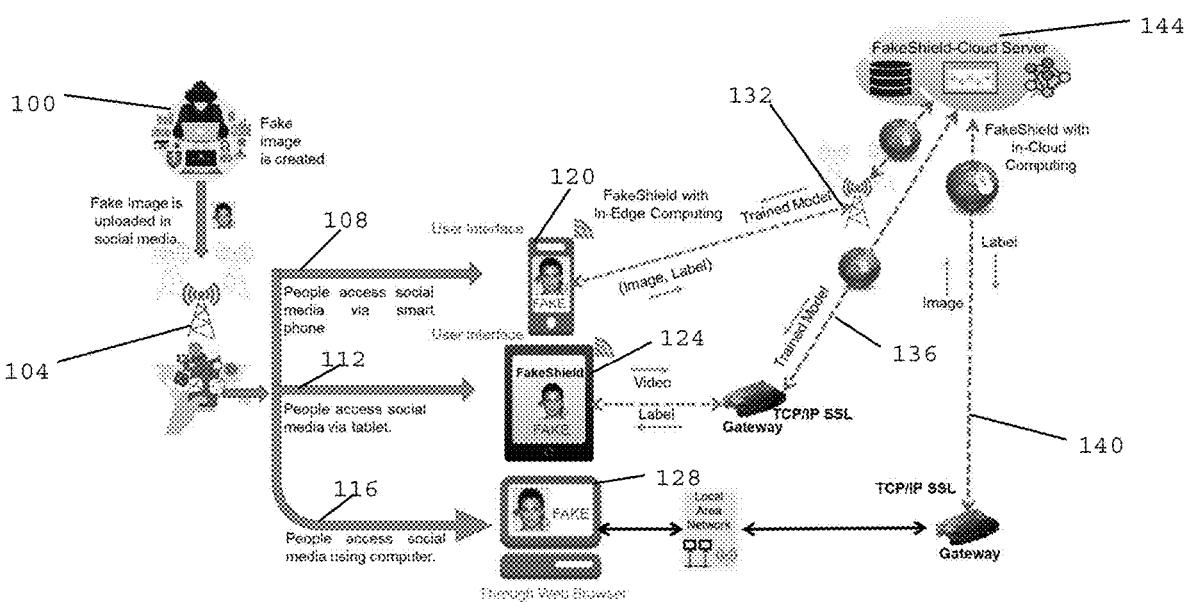
FIG. 2 illustrates a schematic framework of synthetic media detection system according to some embodiments.

A schematic framework of synthetic media detection system is depicted in FIG. 2. In some frameworks, a fake image is created and uploaded 100 and transmitted 104. The transmission can occur according to several pathways. One pathway 108 permits access to social media via the smart phone 120, another pathway 112 permits access to social media via the tablet 124, and/or a further pathway 116 permits access to social media via the laptop or desktop computer 128. Each device, namely the smart phone 120, the tablet 124, and the computer 128 may be in communication with a respective transmission medium 132, 136, and 140 with a FakeShield server 144, which may be cloud based. As an example, the smart phone 120 may receive a trained model from the FakeShield server 144, upload an image for examination to the FakeShield server 144, and then a labeled image is transmitted from the FakeShield server 144 to the smart phone 120. Similarly, the tablet 124 may receive a trained model from the FakeShield server 144, upload an image for examination to the FakeShield server 144, and then a labeled image is transmitted from the FakeShield server 144 to the tablet 124. Likewise, the computer 128 may receive a trained model from the FakeShield server 144, upload an image for examination to the FakeShield server 144, and then a labeled image is transmitted from the FakeShield server 144 to the computer 128. As described herein, a method for detecting deepfake images/videos is provided that includes the training module, duplicate new image detection method to avoid repetitive training, provision for partial training and selected model training. In some aspects, a method of identifying synthetic media can include identifying a facial image in video or images, extracting a first set of features from the facial image, extracting a second set of features from the facial image, where the first set of features are different than the second set of features, inputting the first set of features into a first prediction model, generating a first output indicative of a nature of the facial image, inputting the second set of features into a second prediction model, generating a second output indicative of the nature of the facial image, and determining the nature of the facial image using the first output and the second output.

Figure 3:
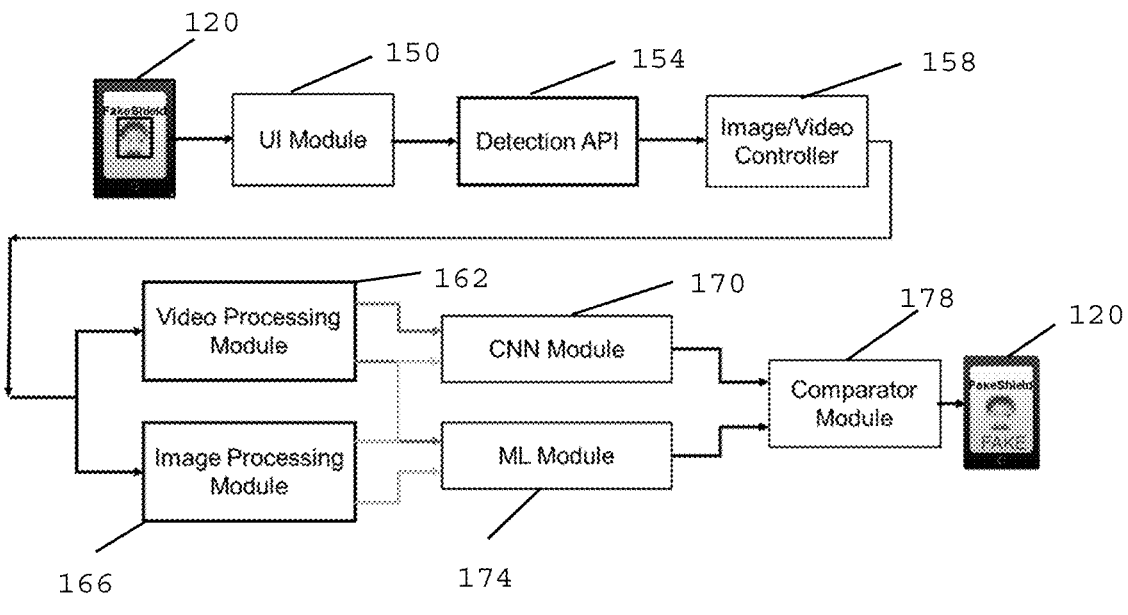
FIG. 3 illustrates a schematic flowsheet of the modules in a synthetic media detection system according to some embodiments.

FIG. 3 shows the high-level structure of the end-to-end FakeShield system. The system can include a number of components, each of which can be present on one or more devices such as the smart phone 120. Initially, a User Interface (UI) Module 150 can be present. The UI Module 150 can serve to intake the image or video being processed. When a person sees an image or video in any social media platform/website via her device, such as the smart phone 120, the tablet 124, or the computer 128, she can check whether the video/image is authentic or deepfake video/image using the proposed FakeShield system. The image/video can first be downloaded to or captured on the device and then uploaded in the FakeShield system through the User Interface (UI) module 150. A Detection API 154 hosted at the device makes the detection process automatic. A user can upload the image/video in the FakeShield system and select which platform to use for computation, and the rest of the process can be fully automated.

The image can comprise a still image or a video file. When the image is in a video, then the Image/Video Controller 158 can identify the image as a video, for example by setting a Video Flag to 1, and the video can be sent to a Video Processing Module 162, otherwise for a still image, the image can be identified as a still image, for example, by setting a Video Flag to 0, and the image can be sent to an Image Processing Module 166.

The system can also include the Video Processing Module 162 and Image Processing Module 166. The Video Processing Module 162 and Image Processing Module 166 can serve a number of functions including the extraction of the video or image to be processed. In the Video Processing Module 162, first key video frames can be extracted. An image of a face can then be extracted from the video frames. For each frame, any area that matches with a face can be detected. If the frames contain more than one face, a separate frame can be generated for each face. Once all the faces are detected in each frame, face extraction can be performed on each face present in that frame. Finally, the face frames can be resized and/or normalized. When an image is being processed rather than video, all the processes can be repeated except the key video frame extraction, as there is only one frame associated with that image. This step will be discussed further below.

The system can also include a plurality of predictions modules. Each of the predictions modules is configured to predict whether or not the faces in the video frames or images are deepfakes using different features extracted from the face frames. In some aspects, each of the predictions modules can comprise one or more classifier models. In some aspects, each processed frame can be then sent to a convolutional neural network (CNN) Module 170 and a machine learning (ML) Module 174 for prediction. These two branches are supplementary methods. The convolutional neural network in the CNN Module 170 can extract various features of the face frame. The system can be designed in such a way that the ML system extracts the global textural features. Two types of feature extraction methods have been used to give focus to both overall features and global textural features. As disclosed herein, textural features can play a significant role in distinguishing real and deepfakes. Features from each branch of extraction can be sent to their corresponding suitable classifier module.

As a Feature Extractor in the CNN Module 170, any efficient but small network (e.g., EfficientNet B1/B1/B2, MobileNetV2, XceptionNet, etc.) can be used. A softmax layer can be used as the corresponding classifier. In some aspects, GAP and Dropout layers can precede the Softmax layer for better regularization.

For the ML Module 174, some of the Haralick's textural features can be calculated in the feature extraction stage. As an example, a LightGBM classifier can be used for faster and lighter processing to classify the image from the textural features.

The predictions modules can accept the features from each feature extractor as inputs and provide an output from a classifier that can identify the image as a deepfake or a real image of a face. The output can then be passed to a Comparator Module 178. The predictions from the CNN Module 170 and ML Module 174 can be compared in the Comparator Module 178. If both the predictions show the same class, no measures are taken and the predicted result is confirmed. However, if the predictions vary with each other, the prediction with the higher confidence score is taken as the final solution. Lastly, the result is printed through the API and an image can be indicated as "FAKE" on the smart phone 120.

Figure 4:
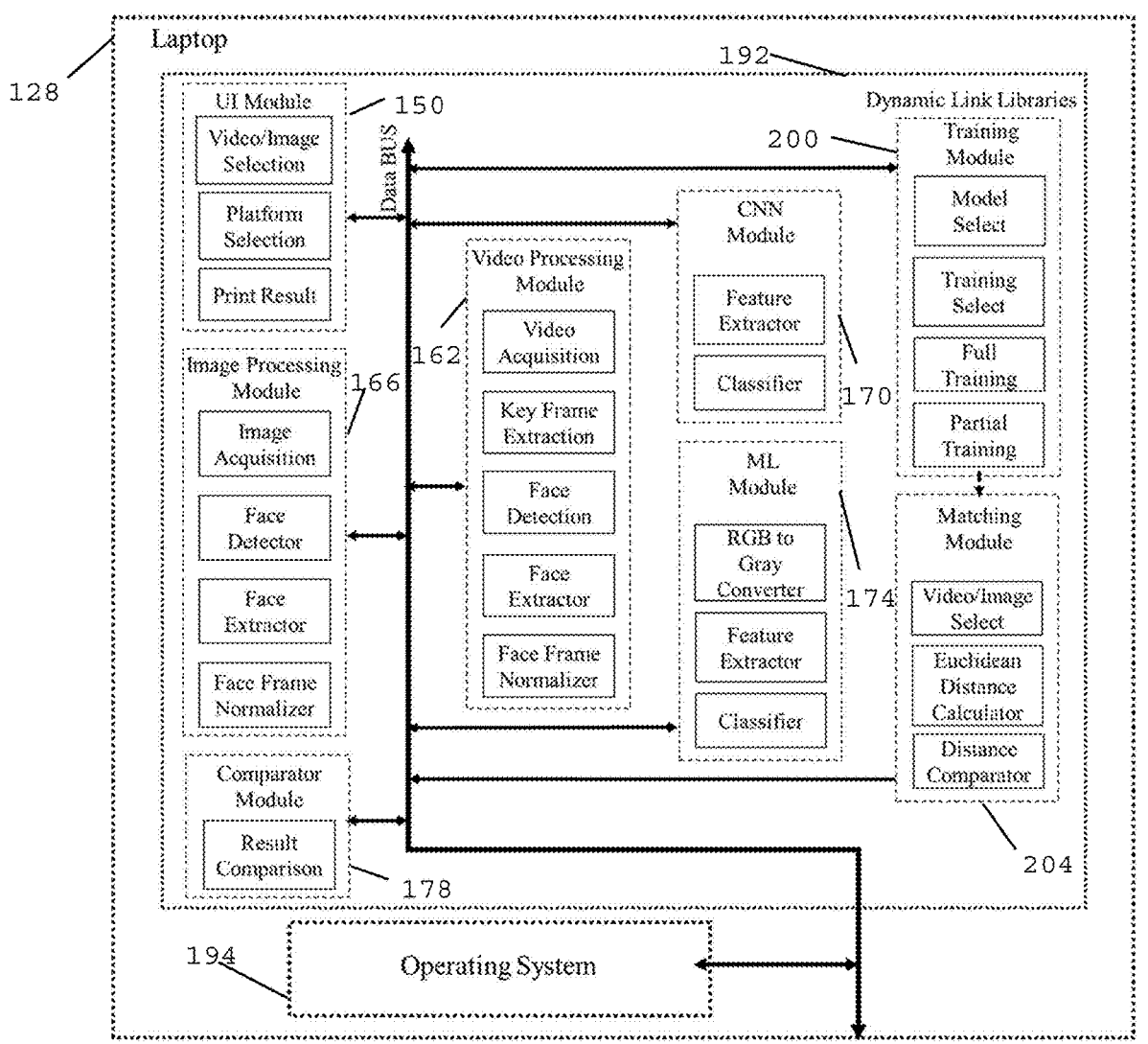
FIG. 4 illustrates a schematic representation of the dynamic link libraries for a synthetic media detection system according to some embodiments.

FIG. 4 shows dynamic link libraries (DLL) 192 on. e.g., the laptop computer 128 with an operating system 194 corresponding to FakeShield. In some embodiments, DLL 192 can include the UI Module 150, the Video Processing Module 162, the Image Processing Module 166, the CNN Module 170, the ML Module 174, the Comparator Module 178, a Training Module 200, and a Matching Module 204. The UI Module 150 can include a Video/Image Selection sub-module, a Platform Selection sub-module, and a Print Result sub-module. The Video Processing Module 162 can include a Video Acquisition sub-module, a Key Frame Extraction sub-module, a Face Detection sub-module, a Face Extractor sub-module, and a Face Frame Normalizer sub-module. The Image Processing Module 166 can include an Image Acquisition sub-module, a Face Detector sub-module, a Face Extractor sub-module, and a Face Frame Normalizer sub-module. The CNN Module 170 can include a Feature Extractor sub-module and a Classifier sub-module. The ML Module 174 can include an RGB to Gray Converter sub-module, a Feature Extractor sub-module, and a Classifier sub-module. The Comparator Module 178 can include a Result Comparison sub-module. The Training Module 200 can include a Model Select sub-module, a Training Select sub-module, a Full Training sub-module, and a Partial Training sub-module. The Matching Module 204 can include a Video/Image Select sub-module, a Euclidean Distance Calculator sub-module, and Distance Comparator sub-module. The modules make it simpler to update and reuse their components. They also reduce the memory overhead when multiple applications use the same feature simultaneously.

The system can also include a training module. In some aspects, the training module consists of the training procedures of CNN Module 170 and ML Module 174. First, the prediction module for which training is required is selected in the Model Select sub-module. Next, the type of training can be selected through the Training Select sub-module. The training procedures for CNN Module 170 and ML Module 174 are described herein with respect to FIG. 5 and FIG. 6. Initially, the procedure as shown in FIG. 5 can be followed for training the CNN Module 170.

Referring to FIG. 5, the training procedure for the CNN Module 170 can begin with a Launch Training Mode at a step 230. Next, an Images Acquisition (Real plus Deepfake) at a step 234 can occur. Afterwards, a Load Total Image Dataset at a step 238 can be conducted. That being done, a question can be conducted whether the data is balanced at a query 242. If no, an Image Augmentation (SMOTE) at a step 246 and then a Load Pre-trained CNN plus Classifier at a step 250 may be conducted. If yes, the step 250 is undertaken after the query 242. Next, a Select Optimizer Adam and Binary Cross Entropy Loss at a step 254 may be conducted. Afterwards, a Set Learning Rate, Batch Size, and Epoch at a step 258 can occur. Thereafter, a Train and Update the Model at a step 262 can complete the procedure.

Referring to FIG. 6, the training procedure for the ML Module 174 can begin with a Launch Training Mode at a step 270. Next, an Images Acquisition (Real plus Deepfake) at a step 274 can occur. Afterwards, a Load Total Image Dataset at a step 278 can be conducted. That being done, a question can be conducted whether the data is balanced at a query 282. If no, Image Augmentation (SMOTE) at a step 286 and then to an Extract Global Textural Features at a step 290 can be administered. If yes, the step 290 may be undertaken after the query 282. Next, a Load the Classifier LightGBM at a step 294 may be conducted. Afterwards, a Select Boosting Type to gbdt and loss to multiclass Loss at a step 298 can occur. That being done, a Select Tree Parameters at a step 302 can be conducted. Afterwards, a Set Learning Rate, and Epoch at a step 306 may be undertaken. Thereafter, a Train and Update the Model at a step 310 can complete the procedure.

With new types of deepfakes availability, the model can be updated with Partial Training as described with respect to FIG. 7. Partial training methods allows the system to avoid catastrophic forgetting by incorporating a subset of total dataset in the training.

Referring to FIG. 7, in some embodiments, the partial training may include a Launch Partial Training Mode at a step 320. That being done, a question can be asked such as, "Are all the New Videos/Images already in the Main Dataset? Call Matching Module" at a query 328. A New Videos/ Images Set at a step 324 can be inputted into the query 328. If yes, a No Training is Required at a step 332, ending the method. If no, a Select the New Videos/Images Subset at a step 336 can be conducted. Next, Combine and Load the Two Sets at a step 340 can be undertaken while receiving a Select a Subset of Training Dataset at a step 344. Afterwards, a Load Pre-trained Model at a step 348 may be accomplished. That being done, a Select Optimizer Adam and Binary Cross Entropy Loss at a step 352 can occur. Subsequently, a Select Preset Learning Rate, Batch Size, and Epoch at a step 356 can be conducted. Thereafter, a Train and Update the Model at a step 360 can complete the procedure.

For ML Module 174, the initial training process has been shown in FIG. 6 and future partial training in FIG. 8. Referring to FIG. 8, in some embodiments, the partial training may include a Launch Partial Training Mode at a step 370. That being done, a question can be asked such as, "Are all the New Videos/Images already in the Main Dataset? Call Matching Module" at a query 374. A New Videos/ Images Set at a step 378 can be inputted into the query 374. If yes, a No Training is Required at a step 382 can occur, ending the process. If no, a Select the New Videos/Images Subset at a step 386 can be conducted. Next, Combine and Load the Two Sets at a step 390 can be conducted while receiving a Select a Subset of Training Dataset at a step 394. Afterwards, an Extract Global Textural Features at a step 398 may be undertaken. Subsequently, a Load the Pre-trained Classifier LightGBM at a step 402 and then a Select Boosting Type to gbdt and loss to multiclass Loss at a step 406 can occur. That being done, a Select Tree Parameters at a step 410 can be conducted. Afterwards, a Set Learning Rate, and Epoch at a step 414 may be undertaken. Thereafter, a Train and Update the Model at a step 418 can complete the procedure.

To check for duplicate future training samples, a Matching Module can be used. Depending on the value of the Video Flag Image/Video Select, the processes described with respect to FIG. 9 can be initiated.

Figure 9:
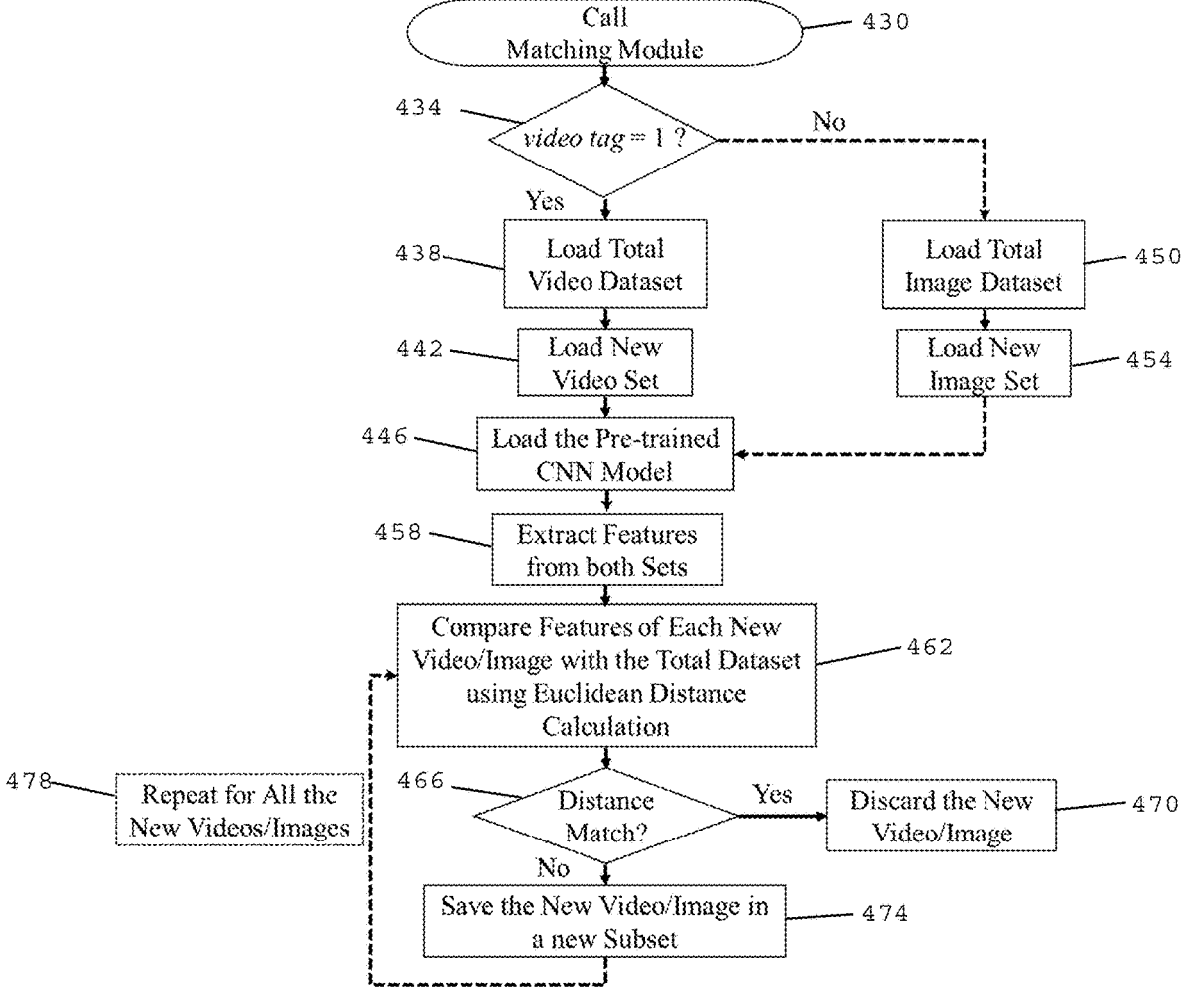
FIG. 9 illustrates the process to check for duplicate training videos and images used in the partial training processes according to some embodiments.

Referring to FIG. 9, in some embodiments, a Call Matching Module at a step 430 can be conducted. That being done, a question of whether a video tag equals one can be inquired at a query 434. If yes, a Load Total Video Dataset at a step 438 can occur. Next, a Load New Video Set at a step 442 may be undertaken. Afterwards, a Load the Pre-trained CNN Model at a step 446 may be administered. If the query 434 is no, a Load Total Image Dataset at a step 450 and then a Load New Image Set at a step 454 can be conducted before undertaking the step 446. Subsequently, an Extract Features from both Sets at a step 458 is undertaken. That being done, a Compare Features of Each New Video/Image with the Total Dataset using Euclidean Distance Calculation at a step 462 may be made. Next, a question can be asked if "Distance Match?" at a query 466. If yes, a Discard the New Video/ Image at a step 470 can occur. If not, a Save the New Video/Image in a new Subset at a step 474 and then a Repeat for All the New Videos/Images at a step 478 may be done before returning to Step 462.

Figure 10:
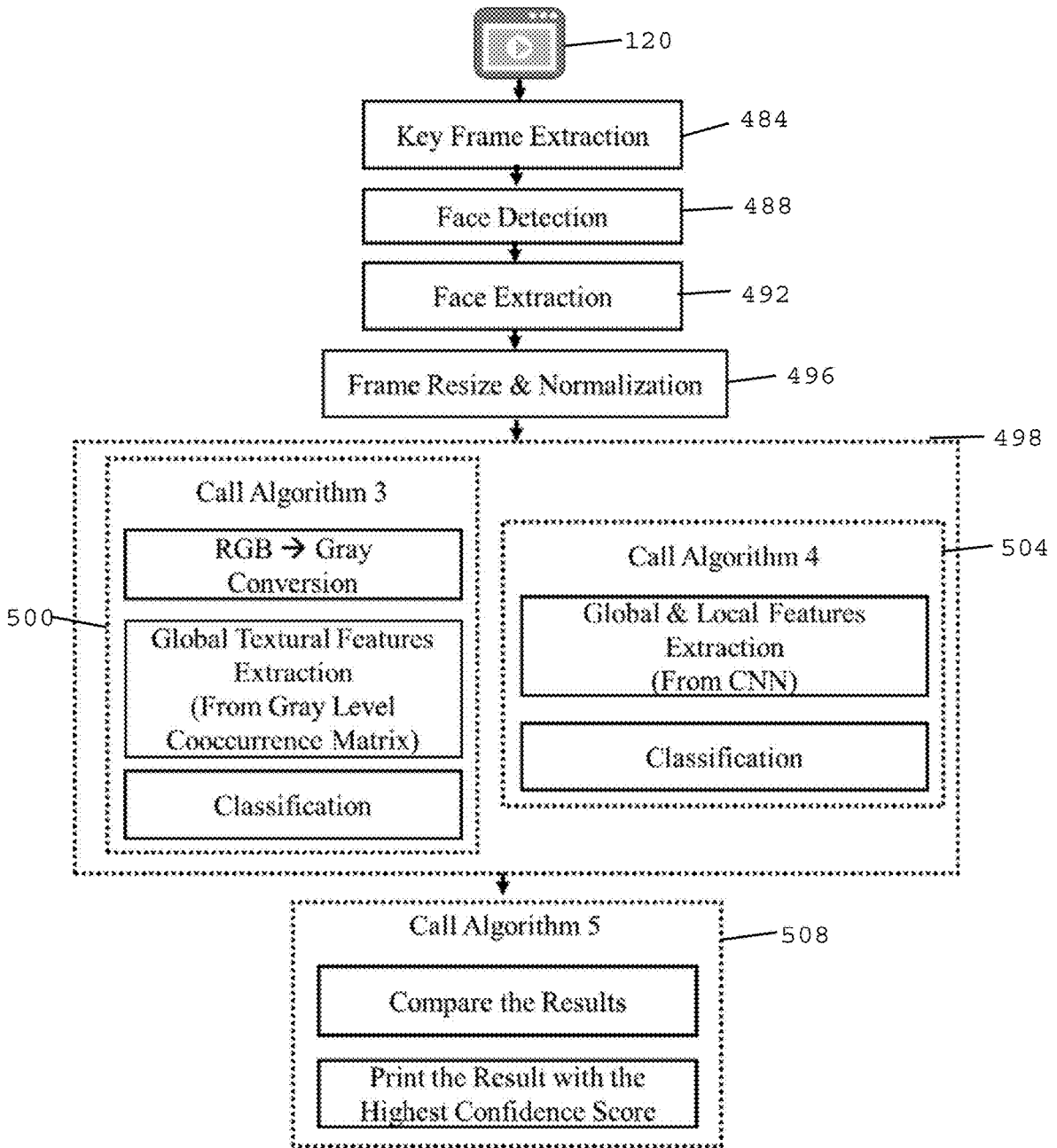
FIG. 10 illustrates a flowchart of the synthetic media detection method according to some embodiments.

Having described the components of the system, various methods of detecting a deepfake can be carried out. When the video is selected in the system through the UI module 150 and a video flag is set to 1, a testing video can be available for checking. As mentioned earlier, first, key video frames can be extracted. For each frame, any area that matches with a face, is detected. If the frames contain more than one face, a separate frame is generated for each face. Once all the faces are detected in each frame, face extraction is performed on each face present in that frame. Finally, the face frames are resized, and/or normalized. FIG. 10. shows the process workflow mentioning the steps of the applied algorithms.

Referring to FIG. 10, in some embodiments, a device such as a smart phone 120 can initiate a Key Frame Extraction at a step 484. Next, a Face Detection at a step 488 can be undertaken. Afterwards, a Face Extraction at a step 492 can be conducted. Subsequently, a Frame Resize and Normalization at a step 496 can be administered. That being done, several algorithms may be run, such as a Call Algorithm 3 500 and/or a Call Algorithm 4 504 at a step 498. The Call Algorithm 3 504 may include an RGB to Gray Conversion sub-routine, a Global Textural Features Extraction (From Gray Level Cooccurrence Matrix) sub-routine, and a Classification sub-routine. The Call Algorithm 4 504 may include a Global and Local Features Extraction (From CNN) sub-routine and a Classification sub-routine. Afterwards, a Call Algorithm 5 508 may be conducted and has a Compare the Results sub-routine and a Print the Result with the Highest Confidence Score sub-routine.

Figure 11:
FIG. 11 illustrates the results of the generation of key video frames for 20 seconds of video according to some embodiments.

As described herein, a key video frame can be used for video processing. Many aspects in a video do not change in consecutive frames. As a result, analyzing each frame and checking for validity consumes a significant amount of resources. A key frame, also known as an intra-frame or i-frame, is a frame that signifies the start or finish of a transition. Subsequent frames only carry the information that differs. To make the model computationally less complex, only key video frames from videos are extracted. As some embodiments herein mainly focuses on visual artifacts that change with forgery, only dealing with key frames can be sufficient to detect a deepfake video. FIG. 11 shows the key frames from a twenty second video. There is total four hundred eighty frames in a twenty second video as the frame rate is twenty-four per second. So instead of dealing with four hundred eighty individual frames only ten frames, namely Frame-1 to Frame-10, are utilized. Hence, only 2.08% of the total videos are checked resulting in a huge savings on time and resource. For extracting the key frame, the frame extractor( ) function of a Katna library can be used.

Once the key video frames are extracted from the video, they are not saved, and face detector is employed to find the face location from the frame. By this way, the image can be processed without wasting any storage. All the visible faces can be detected from each frame. In FIG. 11, even if there are two people are visible in the video, one of their faces is seen. So, a single face is extracted from each frame. For face detection, dlib's 68 landmarks detector can be used. Other state-of-the-art face detectors can be used, but dlib's 68 landmarks detector suffices.

All the detected faces can then be extracted or cropped from the frames. So, the frame now contains only the face region. Next, frames are resized and normalized. Normalization helps to reduce computation with large numbers during feature extraction. This process continues until the last frame is reached. Once the last frame is processed, then the module can exit.

Next, will be the prediction process. CNN Module 170 and ML Module 174 can be called one after other in the laptop environment. However, in FIG. 10, Algorithm 3 for ML Module 174 operation and Algorithm 4 for CNN Module 170 operation are shown in parallel as being independent of each other.

Figure 12:
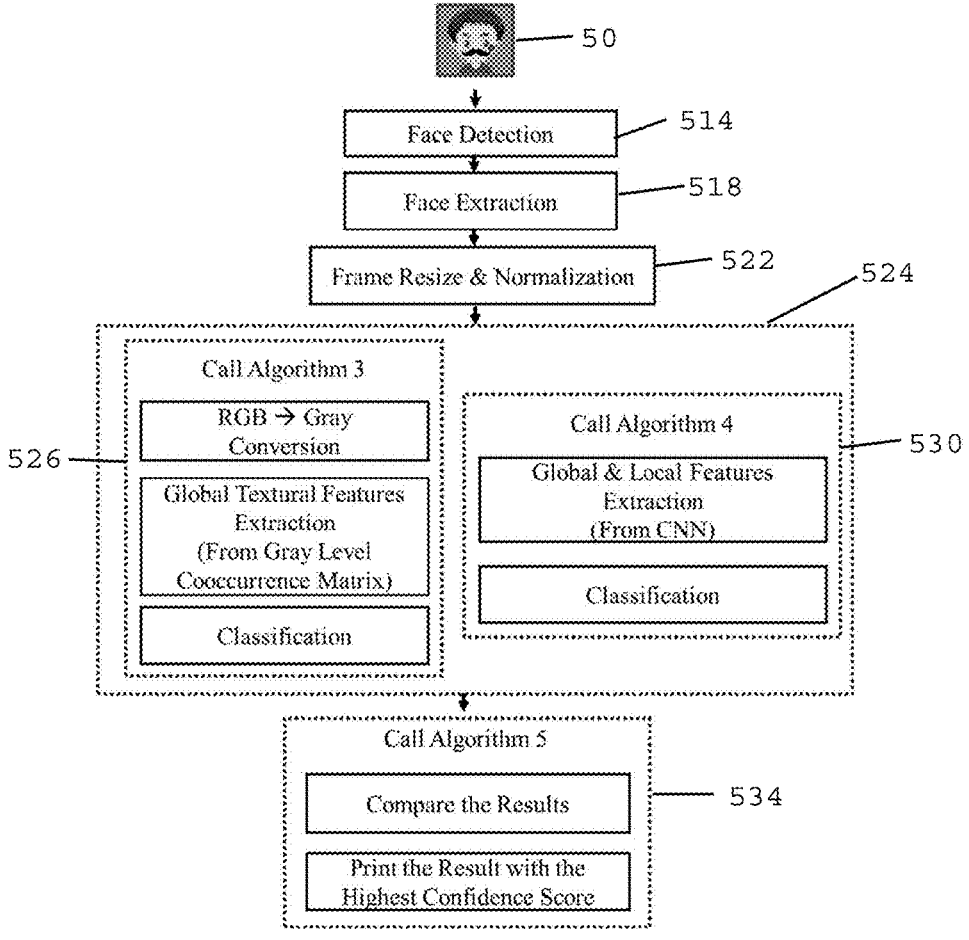
FIG. 12 illustrates another flowchart of the synthetic media detection method according to some embodiments.

Referring to FIG. 12, shows the process workflow mentioning the steps of the applied algorithms to an image 50. In some embodiments, the image 50 can be subjected to a Face Detection at a step 514. Afterwards, a Face Extraction at a step 518 can be conducted. Subsequently, a Frame Resize and Normalization at a step 522 can be administered. That being done, several algorithms may be run, such as a Call Algorithm 3 526 and/or a Call Algorithm 4 530 at a step 524. The Call Algorithm 3 526 may include an RGB to Gray Conversion sub-routine, a Global Textural Features Extraction (From Gray Level Cooccurrence Matrix) sub-routine, and a Classification sub-routine. The Call Algorithm 4 530 may include a Global and Local Features Extraction (From CNN) sub-routine and a Classification sub-routine. Afterwards, a Call Algorithm 5 534 may be conducted and has a Compare the Results sub-routine and a Print the Result with the Highest Confidence Score sub-routine.

The final result can be calculated using Algorithm 5 in the Comparator Module 178. The result is then sent to the user via UI Module 150 through the proposed Detection API 154 described in detail in FIG. 13. The detailed procedures of predictions are described in Algorithms 3, 4, and 5.

Figure 13:
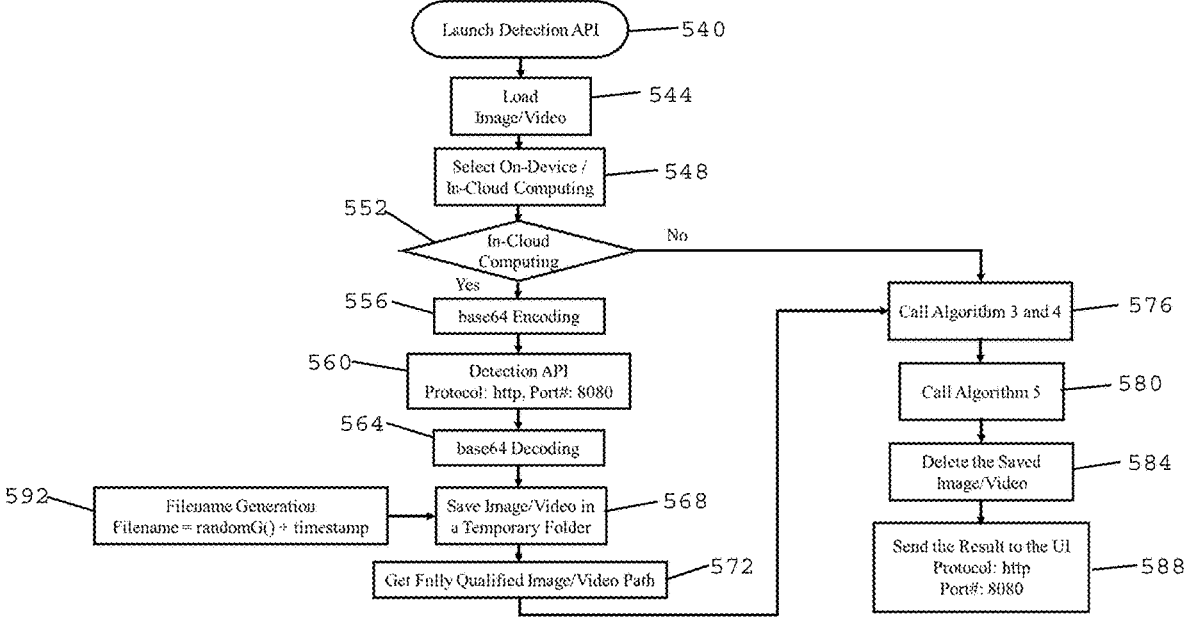
FIG. 13 illustrates a detection API workflow according to some embodiments.

Referring to FIG. 13, the detailed procedures of predictions can begin with a Launch Detection API at a step 540. Next, a Load Image/Video at a step 544 can occur. Afterwards, a Select On-Device/In-Cloud Computing at a step 548 can be administered. That being done, a question is conducted whether In-Cloud Computing is conducted at a query 552. If yes, a base64 Encoding at a step 556 can be undertaken and then to a Detection API Protocol: http, Port #: 8080 at a step 560 can occur. That being done, a base64 Decoding at a step 564 may be administered, and then a Save Image/Video in a Temporary Folder at a step 568. A Filename Generation Filename Equals randomG( ) plus timestamp at a step 592 can be inputted into the step 568. Next, a Get Fully Qualified Image/Video Path at a step 572 can occur after the step 568. That being done, a Call Algorithms 3 and 4 at a step 576 can be conducted. Alternatively, if the query 552 is no, then the step 576 can be administered. Subsequently, a Call Algorithm 5 at a step 580 can be undertaken. Afterwards, a Delete the Saved Image/Video at a step 584 may be accomplished. Thereafter, a Send the Result to the UI Protocol: http Port #: 8080 at a step 588 can be conducted.

When the image is selected in the system through the UI module 150 and a video flag is set to 0, a testing image is available for checking. However, in the Image Processing Module 166, all the processes are repeated except the key video frame extraction, as there is only one frame associated with that image.

For the image, any area that matches with a face, is detected. If the image contains more than one face, separate frame is generated for each face. Once all the faces are detected in each frame, face extraction is performed on each face present in that frame. Finally, the face frames are resized, and normalized. FIG. 12 shows the process workflow mentioning the steps of the applied algorithms.

Once the image is available for checking, a face detector can be employed to find the face location from the frame. All the visible faces can be detected from the image. For face detection, dlib's 68 landmarks detector can be used as an example. Other state-of-the-art face detectors can also be used.

All the detected faces can then be extracted or cropped from the images. So, the image frame now contains only the face region. Next, image frames can be resized and normalized. Normalization helps to reduce computation with large numbers during feature extraction. If the image contains a multiple of people faces, frames can be generated for each face.

This process continues until all the face frames of the image are processed. Once the last face frame is processed, then the module can exit.

Next, the prediction of the deepfake can be made. The CNN Module 170 and ML Module 174 can be called one after other in the laptop environment. However, as shown in FIG. 12, Algorithm 3 526 for the ML Module 174 operation and Algorithm 4 530 for the CNN Module 170 operation are shown in parallel. The modules are independent, and can be operated in parallel, but do not have to be operated simultaneously.

In some aspects, the final result can be calculated using Algorithm 5 in the Comparator Module 178. The result is then sent to the user via UI Module 150 through the proposed Detection API 154 described in detail in FIG. 13. The detailed procedures of predictions are described in Algorithms 3, 4, and 5.

Once the resized and normalized frames obtained from the videos or the images are done with processing, they are sent to the CNN Module 170 and ML Module 174. As part of the feature extraction for the ML Module 174, there are three stages—RGB-to-Gray Converter, Feature Extractor, and Classifier. The RGB face frame can first be converted to Gray level color space in RGB-to-Gray Converter. The global textural features of the face frames can be calculated using Algorithm 3. The gray level cooccurrence matrix (GLCM) can be calculated for four distances d=1, 2, 3, and 5 and three angles $\theta$=0, $\pi$/4, and $\pi$/2 to generate the feature vector for the face frame in Feature Extractor. This process can be repeated for all the face frames. A total of 12 (4×3) GLCM for each face frame can be obtained. For each GLCM, five of Haralick's Textural features—contrast, homogeneity, correlation, energy, and dissimilarity—can be calculated. Finally, a feature vector, of size 60 (12×5) can be formed for each frame. This feature vector can then be passed or fed to the trained classifier for prediction. As in IoT environment, the processing resources may be limited, and the classifier can be selected to have relatively low processing intensity such as LightGBM with boosting type "Gradient Boosting Decision Tree (gbdt)". It is a tree-based algorithm. The advantage of using this classifier over others include:

The algorithm uses histograms to learn. It is cost effective because for a histogram-based algorithm the time complexity is proportional to the number of bins, not to the data volume once histograms are made.

Use of discrete bins reduces the memory usage which is a limiting factor at an edge device.

Training can be very fast as it is distributed.

If any frame of the video is predicted fake, the video is called fake, otherwise the video can be identified as real. For images, the predicted result is the result as images have only one frame.

The CNN Module 170 can comprise a feature extractor and a classifier. For the feature extractor, any efficient but small network (e.g., EfficientNet B0/B1/B2, MobileNetV2, XceptionNet, etc.) can be used. A softmax layer can be used as the corresponding classifier. GlobalAveragePooling (GAP) and Dropout layers can precede the Softmax layer for better regularization. Both global and local textural features of the face frames can be calculated using Algorithm 4. The feature vector can then be sent to the classifier. If any frame of the video is predicted to be fake, the video is called fake. Otherwise, the video can be identified as being real. For images, the predicted result is the result as images have only one frame.

In some aspects, the final prediction can be performed using Algorithm 5 in the Comparator Module 178. The predictions from Section 4D and 4E are noted along with the confidence scores. If both prediction modules predict the same type, the final result can be set to that type. On the other hand, if the results vary, then the result with highest score can be set as the final result. But if the result predicts different types with same confidence score, then the result can be set as a new type of deepfake being detected.

The Detection API 154 through which user interacts with the system as shown in FIG. 13. It can be called via the UI Module 150. Once the image/video is uploaded by the user, the user has the choice for On-Device/In-Cloud Platform. By default, it is In-Cloud Platform.

The processes have been discussed in detail below. The algorithms describe the different processes used in Fake-Shield. Table 1 describes the purpose of each algorithm.

TABLE 1

Purpose of Algorithms

| Algorithms | Processes |
|---|---|
| Algorithm 1 | End-to-end process to detect deepfake videos |
| Algorithm 2 | End-to-end process to detect deepfake images |
| Algorithm 3 | Process of Predicting the Deepfakes from Global Texture Features |
| Algorithm 4 | Process of Predicting the Deepfakes from Global and Local Features |
| Algorithm 5 | Process of Final Prediction |

An outline of each process is provided below:

---

Algorithm-1 End-to-end process to detect deepfake
video using key video frame approach

---

1. Declare input variables: Test video v, Model M⁻
2. Declare output variables: Label tag
3. Declare and initialize frames, f, face, and resface to 0
4. Assign total number of Key Video Frames to frames, a particular frame to f, cropped face respect to the frame f to face, and resized face respect to the face to resface
5. Declare and initialize realtag and faketag to 0

---

-continued

---

Algorithm-1 End-to-end process to detect deepfake
video using key video frame approach

---

6. Assign real probability of prediction to realtag and fake probability of prediction to faketag
7. Set tag = False
8. Extract key video frames from the video v.
9. Save the extracted frames in frames.
10. for f ∈ frames do
11.    Detect the face for f
12.    Crop the face and Save it in face
13.    Resize the image according to the network input shape, Normalize it, and Save it to resface
14.    Load the Model M⁻
15.    Predict resface
16.    Set realtag to real probability of the prediction
17.    Set faketag to fake probability of the prediction
18.    if realtag >> faketag then
19.       continue
20.    else
21.       Set tag = True
22.       Consider the video as Fake
23.       Break
24.    end if
25. end for

---

Algorithm -2 Process to detect deepfake image

---

1.    Declare input variables: Test image img, Model M⁻
2.    Declare output variables: Label tag
3.    Declare and initialize frame, face, and resface to 0
4.    Assign detected face frame to frame , cropped face frame corresponding to the frame to face, and resized face frame respect to the face to resface
5.    Declare and initialize realtag and faketag to 0
6.    Assign real probability of prediction to realtag and fake probability of prediction to faketag
7.    Set tag = False
8.    Detect the face from img and Save it to frame.
9.    Crop the face from frame and Save it to face.
10.    Resize the image according to the network input shape, Normalize it , and Save it to resface
11.    Load the Model M⁻
12.    Predict resface
13.    Set realtag to real probability of the prediction
14.    Set faketag to fake probability of the prediction
15.    if realtag >> faketag then
16.       Print Real
17.    else
18.       Set tag = True
19.       Print Fake
20.    end if

---

Algorithm-3 Process of Predicting the Deepfake from Global Texture Features.

---

1.    Declare the input variables: Test frame resface, Trained Classifier M⁻
2.    Declare the output variable: Prediction Label tag
3.    Declare and initialize realtag and faketag to 0
4.    Assign real probability of prediction to realtag and fake probability of prediction to faketag
5.    Declare CON, HOM, DIS, COR, and ENR to 0
6.    Set tag = False
7.    Declare variables i and j
8.    Declare an empty G matrix of size i × j
9.    Declare a dataframe df
10.    Assign gray level pixel values of point (x1, y1) to i and (x2, y2) to j
11.    Declare initial and final points to (x1, y1) and (x2, y2) respectively
12.    Set dist ∈ {1, 2, 3, 5}
13.    Set angles ∈ {0, π/4, π/2}
14.    Convert RGB image frame to Gray level image frame
15.    for d ∈ dist do
16.       for θ ∈ angles do
17.          $p_{d,\theta}$ (i, j) = 0
18.          for (x1, y1) ∈ resface do -continued

| Algorithm-3 Process of Predicting the Deepfake from Global Texture Features. |
| --- |

| 19. | x2 = d * cos θ |
| 20. | y2 = d * sin θ |
| 21. | I(x1, y1) = i |
| 22. | I(x2, y2) = j |
| 23. | $p_{d,\theta}$ (i, j) ← $p_{d,\theta}$ (i, j) + 1 |
| 24. | G(i, j) ← $p_{d,\theta}$ (i, j) |
| 25. | end for |

26.
$$CON = \sum_{i,j=0}^{n-1} p_{d,\theta}(i,j) * (i-j)^2$$

27.
$$HOM = \sum_{i,j=0}^{n-1} p_{d,\theta}(i,j) / \left(1 + (i-j)^2\right)$$

28.
$$DIS = \sum_{i,j=0}^{n-1} p_{d,\theta}(i,j) * |i-j|$$

29.
$$COR = \sum_{i,j=0}^{n-1} p_{d,\theta}(i,j) * \left[ \frac{(i-\mu_i)(-\mu_j)}{\sqrt{(\sigma_i^2)(\sigma_j^2)}} \right]$$

30.
$$ENR = \sqrt{\sum_{i,j} p_{i,j}^2}$$

| 31. | end for |
| 32. | df[ CON(d, θ) ] ← CON, df[HOM(d, θ)] ← HOM, df[DIS(d, θ) ] ← DIS, df[COR(d, θ)] ← COR, df[ENR(d, θ)] ← ENR |
| 33. | Load the trained classifier M⁻ |
| 34. | Predict resface |
| 35. | Set realtag to real probability of the prediction |
| 36. | Set faketag to fake probability of the prediction |
| 37. | end for |
| 38. | if realtag >> faketag then |
| 39. | Print Real |
| 40. | else |
| 41. | Set tag = True |
| 42. | Print Fake |
| 43. | end if |

| Algorithm-4 Process of Predicting the Deepfake from Global and Local Features |
| --- |

1. Declare the input variables: Test frame resface, Trained CNN Model M⁻
2. Declare the output variable: Prediction Label tag
3. Declare and initialize realtag and faketag to 0
4. Assign real probability of prediction to realtag and fake probability of prediction to faketag
5. Set tag = False
6. Load the trained model M⁻
7. Classify the image through M⁻
8. Set realtag to real probability of the prediction
9. Set faketag to fake probability of the prediction
10. if realtag >> faketag then
11. 　Print Real
12. else
13. 　Set tag = True
14. 　Print Fake
15. end if

| Algorithm-5 Process of Final Prediction |
| --- |

1. Inputs: Results from Algorithm 3 and Algorithm 4
2. Output: Prediction Label result
3. Declare variables tag1 and tag2.
4. Declare variables c1 and c2
5. Initialize tag1 = result from Algorithm. 3 and c1 = corresponding confidence score
6. Initialize tag2 = result from Algorithm. 4 and c2 = corresponding confidence score
7. if tag1 != tag2 then -continued

| Algorithm-5 Process of Final Prediction |
| --- |

| 8. | if c1 > c2 then |
| 9. | 　result = tag1 |
| 10. | else if c1 < c2 then |
| 11. | 　　result = tag2 |
| 12. | 　else |
| 13. | 　　New type of deepfakes detected. |
| 14. | 　end if |
| 15. | end if |
| 16. | else |
| 17. | 　result = tag1 |
| 18. | end if |

In last several years, deepfake detection has been a hot topic. Researchers in image forensics and computer vision have been working to develop methods to detecting deepfake videos and images. In doing so, the majority of the work has achieved high accuracy however the present systems and methods address the below issues those solution do not cover—

1. The system is a unified system which detects various types of deepfakes including the sophisticated GAN generated videos.
2. The system works for both images and videos.
3. Deepfake videos are detected with very less computation by only checking the key video frames. It is much beneficial for a longer video where a small part is altered.
4. Along with resourceful cloud environment, the system works perfectly well on edge platform.

5. Provision for new deepfakes inclusion has kept through partial training option.

6. Catastrophic forgetting has been avoided by intuitive partial training method.

7. It is a real time system.

8. It is a fully automated system.

Having described various systems and methods herein, certain embodiments can include, but are not limited to:

In an aspect, a method of identifying synthetic media includes identifying a facial image in video or images; extracting a first set of features from the facial image; extracting a second set of features from the facial image, wherein the first set of features are different than the second set of features; inputting the first set of features into a first prediction model; generating a first output indicative of a nature of the facial image; inputting the second set of features into a second prediction model; generating a second output indicative of the nature of the facial image; and determining the nature of the facial image using the first output and the second output.

A second aspect can include the method of the first aspect, further comprises extracting the facial image from the video or images.

A third aspect can include the method of the first or second aspect, wherein the facial image is extracted from a video, and wherein extracting the facial image comprises extracting key frames from the video; detecting one or more frames containing the facial image; and extracting the facial images from the one or more frames.

A fourth aspect can include the method of any one of the proceeding aspects, further comprising normalizing the extracted facial images prior to extracting the first set of features or the second set of features.

A fifth aspect can include the method of any one of the proceeding aspects, wherein the first prediction model is a different type of model from the second prediction model.

A sixth aspect can include the method of any of the proceeding aspects, wherein the first prediction model comprises a convolutional neural network (CNN).

A seventh aspect can include the method of any one of the proceeding aspects, wherein the second prediction model comprises a machine learning (ML) model.

An eighth aspect can include the method of any one of the proceeding aspects, wherein the first set of features comprise textural features of the facial image.

A ninth aspect can include the method of any one of the proceeding aspects, wherein the second set of features comprise global textural features of grayscale version of the facial image.

A tenth aspect can include the method of any one of the proceeding aspects, wherein the global textural features comprise at least one of contrast, homogeneity, correlation, energy, or dissimilarity.

An eleventh aspect can include the method of any one of the proceeding aspects, wherein determining the nature of the facial image comprises determining that the facial image is real in response to the first output indicating that the facial image is real and the second output indicating that the facial image is real.

A twelfth aspect can include the method of any one of the proceeding aspects, wherein determining the nature of the facial image comprises determining that the facial image is synthetic in response to the first output indicating that the facial image is synthetic and the second output indicating that the facial image is synthetic.

A thirteenth aspect can include the method of any one of the proceeding aspects, wherein determining the nature of the facial image comprises determining that the facial image is real in response to one of the first output or the second output indicating that the facial image is real and one of the first output or the second output indicating that the facial image is synthetic, wherein the one of the first output or the second output indicating that the facial image is real has a higher confidence score than the one of the first output or the second output indicating that the facial image is synthetic.

In a fourteenth aspect, a system of identifying synthetic media, the system comprises a memory storing an analysis application; and a processor, wherein the analysis application, when executed on the processor, configures the processor to identify a facial image in video or images; extract a first set of features from the facial image; extract a second set of features from the facial image, wherein the first set of features are different than the second set of features; input the first set of features into a first prediction model; generate a first output indicative of a nature of the facial image; input the second set of features into a second prediction model; generate a second output indicative of the nature of the facial image; and determine the nature of the facial image using the first output and the second output.

A fifteenth aspect can include the system of the fourteenth aspect, wherein the analysis application further configures the processor to extract the facial image from the video or images.

A sixteenth aspect can include the system of the fourteenth aspect or the fifteenth aspect, wherein the facial image is extracted from a video, and wherein the system extract key frames from the video; detect one or more frames containing the facial image; and extract the facial images from the one or more frames.

A seventeenth aspect can include the system of any one of the fourteenth to sixteenth aspects, wherein the analysis application further configures the processor to normalize the extracted facial images prior to extracting the first set of features or the second set of features.

An eighteenth aspect can include the system of any one of the fourteenth to seventeenth aspects, wherein the first prediction model is a different type of model from the second prediction model.

A nineteenth aspect can include the system of any one of the fourteenth to eighteenth aspects, wherein the first prediction model comprises a convolutional neural network (CNN).

A twentieth aspect can include the system of any one of the fourteenth to nineteenth aspects, wherein the second prediction model comprises a machine learning (ML) model.

A twenty first aspect can include the system of any one of the fourteenth to twentieth aspects, wherein the first set of features comprise textural features of the facial image.

A twenty second aspect can include the system of any one of the fourteenth to twenty first aspects, wherein the second set of features comprise global textural features of grayscale version of the facial image.

A twenty third aspect can include the system of any one of the fourteenth to twenty second aspects, wherein the global textural features comprise at least one of contrast, homogeneity, correlation, energy, or dissimilarity.

A twenty fourth aspect can include the system of any one of the fourteenth to twenty third aspects, wherein the analysis application further configures the processor to determine that the facial image is real in response to the first output indicating that the facial image is real and the second output indicating that the facial image is real.

A twenty fifth aspect can include the system of any one of the fourteenth to twenty fourth aspects, wherein the analysis application further configures the processor to determine that the facial image is synthetic in response to the first output indicating that the facial image is synthetic and the second output indicating that the facial image is synthetic.

A twenty sixth aspect can include the system of any one of the fourteenth to twenty fifth aspects, wherein the analysis application further configures the processor to determine that the facial image is real in response to one of the first output or the second output indicating that the facial image is real and one of the first output or the second output indicating that the facial image is synthetic, wherein the one of the first output or the second output indicating that the facial image is real has a higher confidence score than the one of the first output or the second output indicating that the facial image is synthetic.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RL, and an upper limit, RU, is disclosed, any number falling within the range is specifically disclosed. In particular, the following numbers within the range are specifically disclosed: $R=RL+k*(RU-RL)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

We claim:

1. A method of identifying synthetic media, the method comprising:
   identifying a facial image in video or images;
   extracting a first set of features from the facial image;
   extracting a second set of features from the facial image, wherein the first set of features are different than the second set of features;
   inputting the first set of features into a first prediction model;
   generating a first output indicative of a nature of the facial image;
   inputting the second set of features into a second prediction model, wherein the first prediction model is a different type of model from the second prediction model;
   generating a second output indicative of the nature of the facial image; and
   determining the nature of the facial image using the first output and the second output, wherein determining the nature of the facial image comprises determining that the facial image is real in response to one of the first output or the second output indicating that the facial image is real and one of the first output or the second output indicating that the facial image is synthetic, wherein the one of the first output or the second output indicating that the facial image is real has a higher confidence score than the one of the first output or the second output indicating that the facial image is synthetic.

2. The method of claim 1, further comprising:
   extracting the facial image from the video or images.

3. The method of claim 2, wherein the facial image is extracted from a video, and wherein extracting the facial image comprises:
   extracting key frames from the video;
   detecting one or more frames containing the facial image; and
   extracting the facial images from the one or more frames.

4. The method of claim 3, further comprising:
   normalizing the extracted facial images prior to extracting the first set of features or the second set of features.

5. The method of claim 1, wherein the first prediction model comprises a convolutional neural network (CNN), and wherein the second prediction model comprises a machine learning (ML) model.

6. The method of claim 1, wherein the first set of features comprise textural features of the facial image, and wherein the second set of features comprise global textural features of grayscale version of the facial image.

7. The method of claim 6, wherein the global textural features comprise at least one of contrast, homogeneity, correlation, energy, or dissimilarity.

8. The method of claim 1, wherein determining the nature of the facial image comprises:
   determining that the facial image is real in response to the first output indicating that the facial image is real and the second output indicating that the facial image is real.

9. The method of claim 1, wherein determining the nature of the facial image comprises:
   determining that the facial image is synthetic in response to the first output indicating that the facial image is synthetic and the second output indicating that the facial image is synthetic.

10. A system of identifying synthetic media, the system comprising:

a memory storing an analysis application; and a processor, wherein the analysis application, when executed on the processor, configures the processor to:

identify a facial image in video or images;

extract the facial image from the video or images;

extract a first set of features from the facial image;

extract a second set of features from the facial image, wherein the first set of features are different than the second set of features;

input the first set of features into a first prediction model;

generate a first output indicative of a nature of the facial image;

input the second set of features into a second prediction model, wherein the first prediction model is a different type of model from the second prediction model;

generate a second output indicative of the nature of the facial image; and determine the nature of the facial image using the first output and the second output, wherein the analysis application is configured to determine that the facial image is real in response to one of the first output or the second output indicating that the facial image is real and one of the first output or the second output indicating that the facial image is synthetic, wherein the one of the first output or the second output indicating that the facial image is real has a higher confidence score than the one of the first output or the second output indicating that the facial image is synthetic.

11. The system of claim 10, wherein the facial image is extracted from a video, and wherein the system:

extract key frames from the video;

detect one or more frames containing the facial image; and extract the facial images from the one or more frames.

12. The system of claim 10, wherein the first prediction model comprises a convolutional neural network (CNN), and wherein the second prediction model comprises a machine learning (ML) model.

13. The system of claim 10, wherein the first set of features comprise textural features of the facial image, and wherein the second set of features comprise global textural features of grayscale version of the facial image.

14. The system of claim 13, wherein the global textural features comprise at least one of contrast, homogeneity, correlation, energy, or dissimilarity.

15. The system of claim 10, wherein the analysis application further configures the processor to:

determine that the facial image is real in response to the first output indicating that the facial image is real and the second output indicating that the facial image is real.

16. The system of claim 10, wherein the analysis application further configures the processor to:

determine that the facial image is synthetic in response to the first output indicating that the facial image is synthetic and the second output indicating that the facial image is synthetic.

* * * * *